United States Patent
Malton et al.

(10) Patent No.: US 11,341,255 B2
(45) Date of Patent: May 24, 2022

(54) DOCUMENT MANAGEMENT SYSTEM HAVING CONTEXT-BASED ACCESS CONTROL AND RELATED METHODS

(71) Applicant: BlackBerry Limited, Waterloo (CA)

(72) Inventors: Andrew James Malton, Waterloo (CA); Andrew Eric Walenstein, Waterloo (CA); Kyle Jeffrey Owen Quintal, Ottawa (CA); Melike Erol Kantarci, Ottawa (CA); Burak Kantarci, Ottawa (CA)

(73) Assignee: BlackBerry Limited, Waterloo (CA)

( * ) Notice: Subject to any disclaimer, the term of this patent is extended or adjusted under 35 U.S.C. 154(b) by 383 days.

(21) Appl. No.: 16/508,969

(22) Filed: Jul. 11, 2019

(65) Prior Publication Data
US 2021/0012020 A1  Jan. 14, 2021

(51) Int. Cl.
    G06F 21/62   (2013.01)
    G06F 16/23   (2019.01)
    G06N 20/00   (2019.01)
    G06F 21/31   (2013.01)

(52) U.S. Cl.
    CPC .......... *G06F 21/62* (2013.01); *G06F 16/2379* (2019.01); *G06F 21/31* (2013.01); *G06N 20/00* (2019.01)

(58) Field of Classification Search
    CPC .......... G06F 21/31; G06F 21/45; G06F 21/62; G06F 21/6218; G06F 21/554; G06N 20/00; H04L 63/10; H04L 63/102; H04L 63/20
    See application file for complete search history.

(56) References Cited

U.S. PATENT DOCUMENTS

| | | | |
|---|---|---|---|
| 9,396,316 B1* | 7/2016 | Altman | H04L 63/102 |
| 2007/0006321 A1* | 1/2007 | Bantz | G06F 21/6218 726/27 |
| 2007/0136819 A1 | 6/2007 | Ng et al. | |
| 2007/0192588 A1* | 8/2007 | Roskind | G06F 21/40 713/155 |
| 2009/0157570 A1 | 6/2009 | Pall et al. | |
| 2010/0125605 A1 | 5/2010 | Nair et al. | |
| 2011/0016534 A1* | 1/2011 | Jakobsson | H04L 67/22 726/28 |
| 2013/0024238 A1 | 1/2013 | Nielson et al. | |
| 2015/0106888 A1* | 4/2015 | Cheng | H04L 63/102 726/5 |
| 2015/0199347 A1* | 7/2015 | Shnitko | G06F 16/24578 707/727 |
| 2018/0300324 A1* | 10/2018 | Ziraknejad | G06N 20/00 |
| 2020/0125752 A1* | 4/2020 | Farcas | H04L 63/0884 |

OTHER PUBLICATIONS

EESR; EP Application No. 20183686.3 dated Nov. 16, 2020.
(Continued)

*Primary Examiner* — Robert B Leung
(74) *Attorney, Agent, or Firm* — Ridout and Maybee LLP

(57) ABSTRACT

A document management system having context-based access control and related methods are provided. The document management system determines whether to perform user authentication based on derived context-information comprising one or a combination of derived user-context parameters and document-context parameters that provide additional context to document access requests.

22 Claims, 8 Drawing Sheets

(56) References Cited

OTHER PUBLICATIONS

L. Zhou, V. Varadharajan, and M. Hitchens, "Achieving secure role-based access control on encrypted data in cloud storage," IEEE Transactions on Information Forensics and Security, vol. 8, No. 12, pp. 1947-1960 Dec. 2013.
B. Shafiq, J. B. D. Joshi, E. Bertino, and A. Ghafoor, "Secure interoperation in a multidomain environment employing rbac policies," IEEE Transactions on Knowledge and Data Engineering, vol. 17, No. 11, pp. 1557-1577 Nov. 2005.
C. Feltus, E. Dubois, and M. Petit, "Alignment of remmo with rbac to manage access rights in the frame of enterprise architecture," in 2015 IEEE 9th International Conference on Research Challenges in Information Science (RCIS), pp. 262-273 May 2015.
M. Leitner, S. Rinderle-Ma, and J. Mangier, "Aw-rbac: Access control in adaptive workflow systems," in 2011 Sixth International Conference on Availability, Reliability and Security, pp. 27-34 Aug. 2011.
F. Anjomshoa, M. Catalfamo, D. Hecker, N. Helgeland, A. Rasch, B. Kantarci, M. Erol-Kantarci, and S. Schuckers, "Mobile behaviometric framework for sociability assessment and identification of smartphone users," in 2016 IEEE Symposium on Computers and Communication (ISCC), pp. 1084-1089 Jun. 2016.
I. Deutschmann, P. Nordstrm, and L. Nilsson, "Continuous authentication using behavioral biometrics," IT Professional, vol. 15, No. 4, pp. 12-15 Jul. 2013.
O. Adeyinka, "Analysis of problems associated with ipsec vpn technology," in 2008 Canadian Conference on Electrical and Computer Engineering, pp. 001 903-001 908 May 2008.
B. Kantarci, K. G. Carr, and C. D. Pearsall, "SONATA: Social Network Assisted Trustworthiness Assurance in Smart City Crowdsensing," International Journal of Distributed Systems and Technologies (IJDST), vol. 7, No. 1, pp. 59-78 2016.
F. Anjomshoa, M. Aloqaily, B. Kantarci, M. Erol-Kantarci, and S. Schuckers, "Social behaviometrics for personalized devices in the internet of things era," IEEE Access, vol. 5, pp. 12199-12213 2017.
L. Fridman, S. Weber, R. Greenstadt, and M. Karn, "Active authentication on mobile devices via stylometry, application usage, web browsing, and gps location," IEEE Systems Journal, vol. 11, No. 2, pp. 513-521 Jun. 2017.
C. Feng, S. Wu, and N. Liu, "A user-centric machine learning framework for cyber security operations center," in 2017 IEEE International Conference on Intelligence and Security Informatics (ISI), pp. 173-175 Jul. 2017.
L. Watkins, S. Beck, J. Zook, A. Buczak, J. Chavis, W. H. Robinson, J. A. Morales, and S. Mishra, "Using semi-supervised machine learning to address the big data problem in dns networks," in 2017 IEEE 7th Annual Computing and Communication Workshop and Conference (CCWC), Jan. 2017, pp. 1-6 Jan. 2017.
C. M. Sayan, "An intelligent security assistant for cyber security operations," in 2017 IEEE 2nd International Workshops on Foundations and Applications of Self* Systems (FAS*W), Sep. 2017, pp. 375-376 Sep. 2017.
G. Apruzzese, M. Colajanni, L. Ferretti, A. Guido, and M. Marchetti, "On the effectiveness of machine and deep learning for cyber security," in 2018 10th International Conference on Cyber Conflict (CyCon), pp. 371-390 May 2018.
L. Zomlot, S. Chandran, D. Caragea, and X. Ou, "Aiding intrusion analysis using machine learning," in 2013 12th International Conference on Machine Learning and Applications, vol. 2, pp. 40-47 Dec. 2013.
O. Y. Al-Jarrah, A. Siddiqui, M. Elsalamouny, P. D. Yoo, S. Muhaidat, and K. Kim, "Machine-learning-based feature selection techniques for large-scale network intrusion detection," in 2014 IEEE 34th International Conference on Distributed Computing Systems Workshops (ICD- CSW), pp. 177-181. Jun. 2014.
M. Mayhew, M. Atighetchi, A. Adler, and R. Greenstadt, "Use of machine learning in big data analytics for insider threat detection," in MILCOM 2015—2015 IEEE Military Communications Conference, pp. 915-922 Oct. 2015.
K. Wrona, S. Oudkerk, A. Armando, S. Ranise, R. Traverso, L. Ferrari, and R. McEvoy, "Assisted content-based labelling and classification of documents," in 2016 International Conference on Military Communications and Information Systems (ICMCIS), pp. 1-7 May 2016.
K. Chen and D. Wang, "An aspect-oriented approach to privacy-aware access control," in 2007 International Conference on Machine Learning and Cybernetics, vol. 5, pp. 3016-3021 Aug. 2007.
S. Otoum, B. Kantarci, and H. Mouftah, "Adaptively supervised and intrusion-aware data aggregation for wireless sensor clusters in critical infrastructures," in 2018 IEEE International Conference on Communications (ICC), pp. 1-6 May 2018.
Z. Rauen, F. Anjomshoa, and B. Kantarci, "Gesture and sociability-based continuous authentication on smart mobile devices," in 16th ACM International Symposium on Mobility Management and Wireless Access (ACM MobiWac), Oct. 2018 (accepted) 2018.
A. El Masri, H. Wechsler, P. Likarish, C. Grayson, C. Pu, D. Al-Arayed, and B. B. Kang, "Active authentication using scrolling behaviors," in 2015 6th International Conference on Information and Communication Systems (ICICS), pp. 257-262 Apr. 2015.
A. Mansour, M. Sadik, E. Sabir, and M. Azmi, "A context-aware multimodal biometric authentication for cloud-empowered systems," in 2016 International Conference on Wireless Networks and Mobile Communications (WINCOM), pp. 278-285 Oct. 2016.

\* cited by examiner

800

Authentication Request

| Authentication Is Required | |  |
|---|---|---|
| Please confirm identity | | |
| Username | Bob1 | ▼ |
| Password | ***** | ▼ |
| PIN | _ | |

FIG. 8

DOCUMENT MANAGEMENT SYSTEM HAVING CONTEXT-BASED ACCESS CONTROL AND RELATED METHODS

TECHNICAL FIELD

The present disclosure relates generally to document management systems and methods, and more particularly to a document management system having context-based access control and related methods.

BACKGROUND

Users may access documents in almost any context with the availability of wireless communication devices. Access control to document management systems are typically based a role-based access control model in which access to documents is controlled based on permissions assigned to particular documents and users. Role-based access control (RBAC) systems are typically based on pre-authentication of the user with authentication being performed by an independent system, such as an authentication system of the operating system of the host device. A drawback to this approach is that it exposes the document management systems to unauthorized access if a user or system is able to bypass or breach the authentication system. For this and other reasons, there remains a need for document management systems having improved access control.

BRIEF DESCRIPTION OF THE DRAWINGS

FIG. 8 is an example prompt user interface screen for requesting authentication in accordance with an example embodiment of the present disclosure.

DETAILED DESCRIPTION OF EXAMPLE EMBODIMENTS

Figure 1:
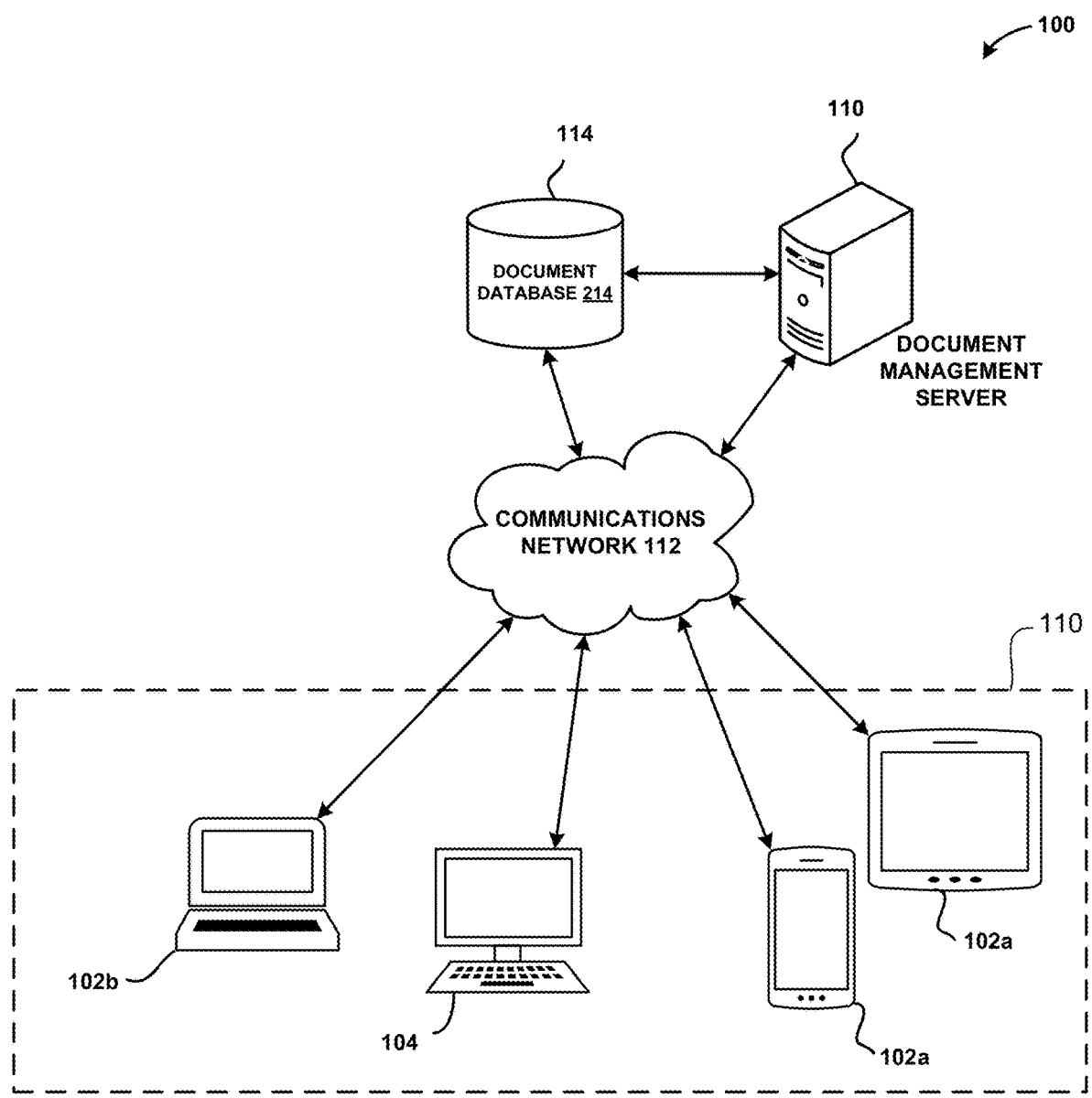
FIG. 1 is a simplified block diagram illustrating a document management system in accordance with an example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The present disclosure provides a document management system having context-based access control and related methods are provided. The document management system determines whether to perform user authentication in response to a document access request based on derived context-information comprising one or a combination of derived user-context parameters (also referred to as derived user-centric parameters) and document-context parameters (also referred to as derived document-centric parameters) that provide additional context to document access requests. The derived context-information may comprise a document-valuation property representing a measure of value of a particular document, a document shareability property representing a measure of how much a particular document is shared between users, a user-cooperation property indicating a measure of how a particular user cooperates with other users, or any combination thereof. The user authentication may be performed in response to a document access request to access a document that the user has rights to access but for which the derived context-information associated with the document access request indicates user authentication should be performed. User authentication may be indicated when derived context-information associated the requested document and/or the request user does not historical patterns for the user. For example, user authentication may be indicated when a user attempts to access more documents than is normal, when a user attempts to access documents at different times of day than is normal, when a user attempts to access different types of documents that is normal, or when a user attempts to access different documents in a different type of way that is normal (e.g., write or delete vs. read) among other possibilities. The indication that user authentication should be performed may be wholly independent of whether the user has access rights to the requested document and is thus distinct from conventional access control challenges in an RBAC system. The document management system and related methods of the present disclosure use the derived context-information to identify potentially malicious and suspicious events based on historical user behavior and determine whether to perform user authentication in response to a document access request when the derived context-information associated with the document access request is suspicious.

The document management system and related methods of the present disclosure may leverage machine learning to identify hidden patterns that may exist within a document management system to make intelligent inferences by analyzing user behavior to flag potentially malicious and suspicious events. Insider threats are a reality in large industries, and these threats have defining properties that may be clustered into suspicious behavior categories for predictive and in-depth features vulnerability analysis. With large amounts of daily user interactions in a document management system, patterns may emerge when analyzing when actions are performed, on which documents, in collaboration with how many other users, and the amount of performed changes within a specific time period, and so forth. These interactions may be used for continuous authentication purposes and may be combined with biometrics to increase security in performing access control to a document management system. There is a trade-off between user work efficiency and user access security in access control systems. For example, although highly robust security measures are desirable, the access control system should not unduly interfere with user behavior. The use of machine learning techniques user access security without unduly interfering with user behavior and user work efficiency.

In accordance with one aspect of the present disclosure, there is a provided a method of performing access control in a document management system, comprising: receiving a document access request for a document in the plurality of documents stored by the document management, wherein the document access request is associated with a user in the plurality of users of the document management system, wherein the document access request comprises document properties comprising document-identifying properties identifying the document and document-access properties specifying a type of access; determining whether the document access request matches access criteria for granting the document access request (without user authentication); and, in response to determining that the document access request does not match the access criteria for granting the document access request (without user authentication), sending an authentication request to the user (via a user account).

In some examples, determining whether the document access request matches access criteria for granting the document access request (without user authentication) is based on a comparison of the document properties of the requested document and user properties of the user associated with the document access request to the derived document-context properties associated with the requested document and the derived user-context properties associated with the user associated with the document access request.

In some examples, the method further comprises: maintaining a first set of records relating to a plurality of documents stored by the document management system, each of the first set of records comprising a plurality of document properties, the document properties comprising document-identifying properties, document-access properties and derived document-context properties; maintaining a second set of records relating to the plurality of users of the document management system, each of the second set of records comprising user properties, the user properties comprising user-identifying properties, user-access properties and derived user-context properties.

In some examples, the method further comprises: in response to successful authentication of the user, permitting access to the requested document.

In some examples, the method further comprises: in response to determining that the document access request does match the access criteria, permitting access to the requested document.

In some examples, the document-identifying properties comprise one or a combination of a document name, type, location of creation or associated user group or business unit, and the document-access properties comprise one or a combination of access date, access type, access time or access location.

In some examples, the derived document-context properties are derived from document access over a period of time, and derived user-context properties are derived from instances of document access over a period of time.

In some examples, the derived document-context properties are derived over a plurality of periods of time.

In some examples, the derived document-context properties are weighted measures of the recency of access, wherein the instances of document access during a more current period of time are assigned proportionately more weight than instances of document access during an older period of time.

In some examples, the weight given to document access during an older period of time decreases non-linearly over time.

In some examples, the derived document-context properties are weighted aggregate-measures of one or more of a frequency at which the document is accessed, a type of access taken with respect to the document, a location of the document access, a time at which the document access or action occurred, an identity of the user accessing the document, a communication type used to access the document, or a value of the document.

In some examples, the type of access taken with respect to the document is one of read (R), write (W), delete (X), set a permission designation (S), or clear a permission designation (C) actions.

In some examples, the derived document-context properties is a weighted measure of the nature of the action with a read action being proportionately less weight than a write action.

In some examples, the derived user-context properties are derived over a plurality of periods of time.

In some examples, the derived user-context properties are weighted measures of the recency of access, wherein the instances of document access during a more current period of time are assigned proportionately more weight than instances of document access during an older period of time.

In some examples, the weight given to document access during an older period of time decreases non-linearly over time.

In some examples, the derived user-context properties comprise one or more of a measure of user-activity in relation to a user's activity history, a measure of user-activity in relation to an average user in the same user group or business unit, or a measure of user-activity in relation to an average user of the document management system.

In some examples, the derived user-context properties are weighted aggregate-measures of one or more of a frequency at which a user access documents, a type of access a user utilizes in accessing documents, a location of a user when accessing documents, a time at which a user accesses documents, a communication type used to accesses documents, or a value of the documents accessed by a user.

In some examples, the type of access taken with respect to the document is one of read (R), write (W), delete (X), set a permission designation (S), or clear a permission designation (C) actions.

In some examples, the derived user-context properties is a weighted measure of the nature of the action with a read action being proportionately less weight than a write action.

In some examples, the method further comprises: adding the document-access properties of the document access request to the first set of records for the requested document, and adding the user-access properties of the document access request to the second set of records for the requesting user.

In some examples, the method further comprises: updating the derived document-context properties using the document-access properties, and updating the derived user-context properties using the added user-access properties of the document access request.

In some examples, the period of time is selected from the group consisting of a single day, a single week, bi-weekly, or monthly.

In some examples, the derived document-context properties comprises a document-valuation property representing a measure of value of a particular document and a document shareability property representing a measure of how much a particular document is shared between users, and wherein derived user-context properties comprises a user-cooperation property indicating a measure of how a particular user cooperates with other users.

In some examples, determining whether the document access request matches access criteria for granting the document access request comprises: applying one or more classifiers for determining whether the document access request matches access criteria for granting the document access request; determining true positive rates of the one or more classifiers; assigning weights to the one or more classifiers based on the true positive rates; determining whether the document access request matches access criteria for granting the document access request based on the outputs of the one or more classifiers and the weights assigned to the one or more classifiers.

In some examples, the method further comprises: determining a performance of each of the one or more classifiers; determining a relative performance of each of the one or more classifiers, wherein the weights assigned to the one or more classifiers are based on the relative performance.

In some examples, the relative performance is based on trust scores.

In some examples, the true positive rates of the one or more classifiers is based on a weighted measure of the recency of performance with true positive rates for a more current period of time being proportionately more weight than a later period of time.

In some examples, the weights assigned to the one or more classifiers during an older period of time decreases non-linearly over time.

In some examples, the method further comprises: assigning weights to the derived document-context properties and the derived user-context properties based on the true positive rates; wherein the determination whether the document access request matches access criteria for granting the document access request is based on the weighs assigned to the one or more classifiers and the weights assigned to the derived document-context properties and the derived user-context properties.

In some examples, the one or more classifiers are selected from the group consisting of Random Forest (RF), Naive Bayes (NB) and Support Vector Machines (SVM).

In some examples, the one or more classifiers comprises a Random Forest (RF), Naive Bayes (NB) and Support Vector Machines (SVM) classifier.

In accordance with another aspect of the present disclosure, there is provided a computing device having a processor and a memory coupled to the processor, the memory having tangibly stored thereon executable instructions for execution by the processor, wherein the executable instructions, when executed by the processor, cause the computing device to perform the methods described herein.

In accordance with a further aspect of the present disclosure, there is provided a non-transitory machine readable medium having tangibly stored thereon executable instructions for execution by a processor of a computing device, wherein the executable instructions, when executed by the processor, cause the computing device to perform the methods described herein.

Document Management System

Reference is first made to FIG. 1 which shows in simplified block diagram form of a document management system ("DMS") 100. The DMS 100 comprises a communications network 112 that enables a plurality of communication devices 101 to exchange data and one or more document databases 114 and one or more document management servers 110 coupled to the communications network 112. The communications network 112 may be any type of network capable of enabling a plurality of communication devices 101 to exchange data such as, for example, a local area network (LAN), such as a wireless local area network (WLAN) such as Wi-Fi™, used in a work office environment, a wireless personal area network (WPAN), such as Bluetooth™ based WPAN, a wide area network (WAN), a public-switched telephone network (PSTN), or a public-land mobile network (PLMN), which is also referred to as a wireless wide area network (WWAN) or a cellular network. The communications network 112 may comprise a plurality of the aforementioned network types coupled via appropriate methods known in the art.

The communication devices 101 and server(s) 110 may communicate securely using, for example, Transport Layer Security (TLS) or its predecessor Secure Sockets Layer (SSL). TLS and SSL are cryptographic protocols which provide communications security over the Internet. TLS and SSL encrypt network connections above the transport layer using symmetric cryptography for privacy and a keyed message authentication code for message reliability. The communication devices 101 and server(s) 110 are provided with encryption key(s) for secure communications using TSL or SSL, which are typically stored in persistent memory of the communication devices 101 and server(s) 110.

The plurality of communication devices 101 may comprise one or more mobile wireless communications devices ("mobile devices") 102, one or more personal computers 104, or a combination thereof. The mobile devices 102 may comprise, but are not limited to, one or more handheld wireless communications devices represented by reference 102a, such as smartphones or tablets and/or one or more laptop or notebook computers (also known as a netbook or ultrabook computer depending on the device capabilities) represented by reference 102b. The mobile devices 102 may include devices equipped for cellular communication through PLMN or PSTN, mobile devices equipped for Wi-Fi™ communications over WLAN or WAN, or dual-mode devices capable of both cellular and Wi-Fi™ communications. In addition to cellular and Wi-Fi™ communications, the mobile devices 102 may also be equipped for Bluetooth™ and/or NFC (near-field communication) communications.

The computers 104 and server(s) 110 may include any computing device equipped for communicating over LAN, WLAN, Bluetooth, WAN, PSTN, PLMN, or any combination thereof. For example, the computers 104 may be a personal computer such as a desktop computer. Although FIG. 1 illustrates the DMS 100 as having a certain number of communication devices 101 and server(s) 110, this is for illustrative purposes only. The DMS 100 may comprise any number of communication devices 101 and server(s) 110 of the various types.

The document management server 110 may be connected to the document database 114, either directly or through the communications network 112. The document database 114 stores a plurality of documents, and may be physically located either locally or remotely from the document management server 110. The document database 114 may be a module of the document management server 110. The document management server 110 provides administrative control and management capabilities over the documents stored within the document database 114.

The document management server 110 and document database 114 may be implemented in a virtualized environment such that, although depicted as a single block in FIG. 1, the document management server 110 and document database 114 may be implemented across a number of devices in a cloud computing environment.

The document management server 110 and document database 114 may comprise one or more computers, each comprising memory and one or more processors that are configured by one or more server modules stored in the memory, to provide server functions for a document access control application 244 described below. The computer(s) may include one or more input devices and a display. Suitable server computer constructions are known in the art and will not be described herein. For example, one of the communication devices 101 in the DMS 100 may act as a server agent providing the functions of the document management server 110 and document database 114 as well as act as a client rather than have a dedicated document management server 110 and document database 114. For example, it is contemplated that a document access application (not shown) may be downloaded by the communication devices 101 that allows any of one of the communication devices 101 to act as the server, client or both.

Figure 2:
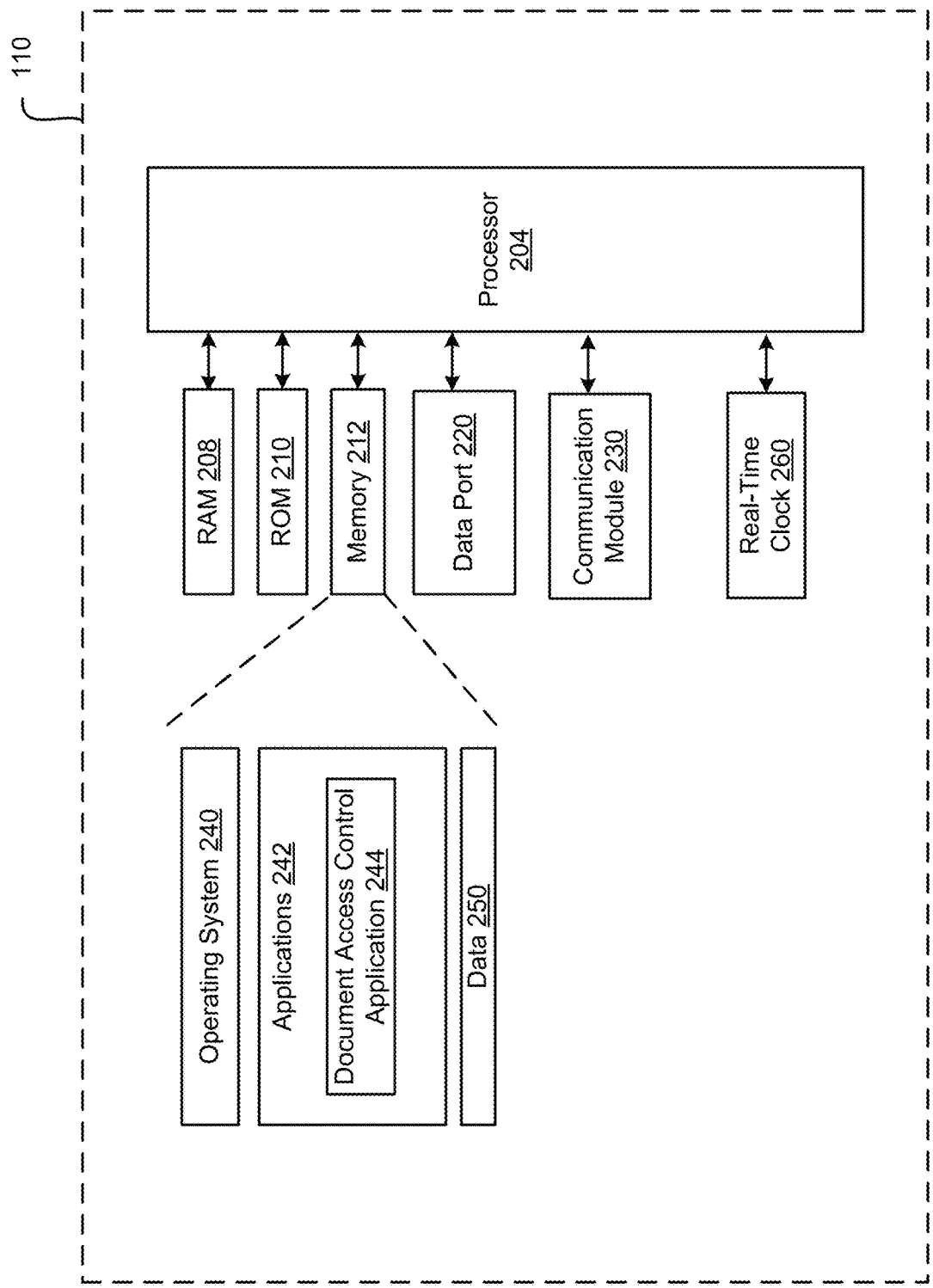
FIG. 2 is a simplified block diagram illustrating an example document server in accordance with an example embodiment of the present disclosure.

Referring to FIG. 2, an example embodiment of a document management server 110 of the present disclosure will be described. The document management server 110 comprises at least one processor 204 which controls the overall operation of the document management server 110. The processor 204 is coupled to a plurality of components via a communication bus (not shown) which provides a communication path between the components and the processor 204. The document management server 110 also comprises a Random Access Memory (RAM) 208, Read Only Memory (ROM) 210, a persistent (non-volatile) memory 212 which may be flash erasable programmable read only memory (EPROM) ("flash memory") or other suitable form of memory, a data port 222 such as a serial data port (e.g., Universal Serial Bus (USB) data port), communication module 230 and a real-time clock (RTC) 260.

The communication module 230 may comprise any combination of a long-range wireless communication module, a short-range wireless communication module, or a wired communication module (e.g., Ethernet or the like). The long-range wireless communication module comprises one or more radio frequency (RF) transceivers for communicating with a radio access network (e.g., cellular network). The RF transceivers may communicate with any one of a plurality of fixed transceiver base stations of a cellular network within its geographic coverage area. The long-range wireless communication module may also comprise a wireless local area network (WLAN) transceiver for communicating with a WLAN via a WLAN access point (AP). The WLAN may comprise a Wi-Fi wireless network which conforms to IEEE 802.11x standards (sometimes referred to as Wi-Fi®) or other communication protocol. The short-range communication module may comprise devices, associated circuits and components for providing various types of short-range wireless communication such as Bluetooth™, RFID (radio frequency identification), near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication module 230 of the document management server 110 may comprise one or more antennas, a processor such as a digital signal processor (DSP), and local oscillators (LOs). The specific design and implementation of the communication module 230 is dependent upon the communication technologies implemented by the document management server 110. Data received by the document management server 110 may be decompressed and decrypted by a decoder (not shown).

Operating system software 240 executed by the processor 204 is stored in the persistent memory 212 but may be stored in other types of memory devices, such as ROM 208 or similar storage element. A number of applications 242 executed by the processor 204 are also stored in the persistent memory 212. The applications 242 include the document access control application 244. Other applications are also stored in the memory 126. The document access control application 244, when executed by the processor 204, allows the document management server 110 to perform the methods described herein.

The server functions of the document management server 110 include storage of documentation, storage of document properties, and storage of user properties. In addition to the known features and functions of storing servers, such as those described above, the document management server 110 may receive document access requests, derive document access and user access properties from the stored data, make determinations of authentication prompts, and provide document access to a user. The operation of such features and functions is described more fully below.

Context-Based Access Control Method

Figure 3:
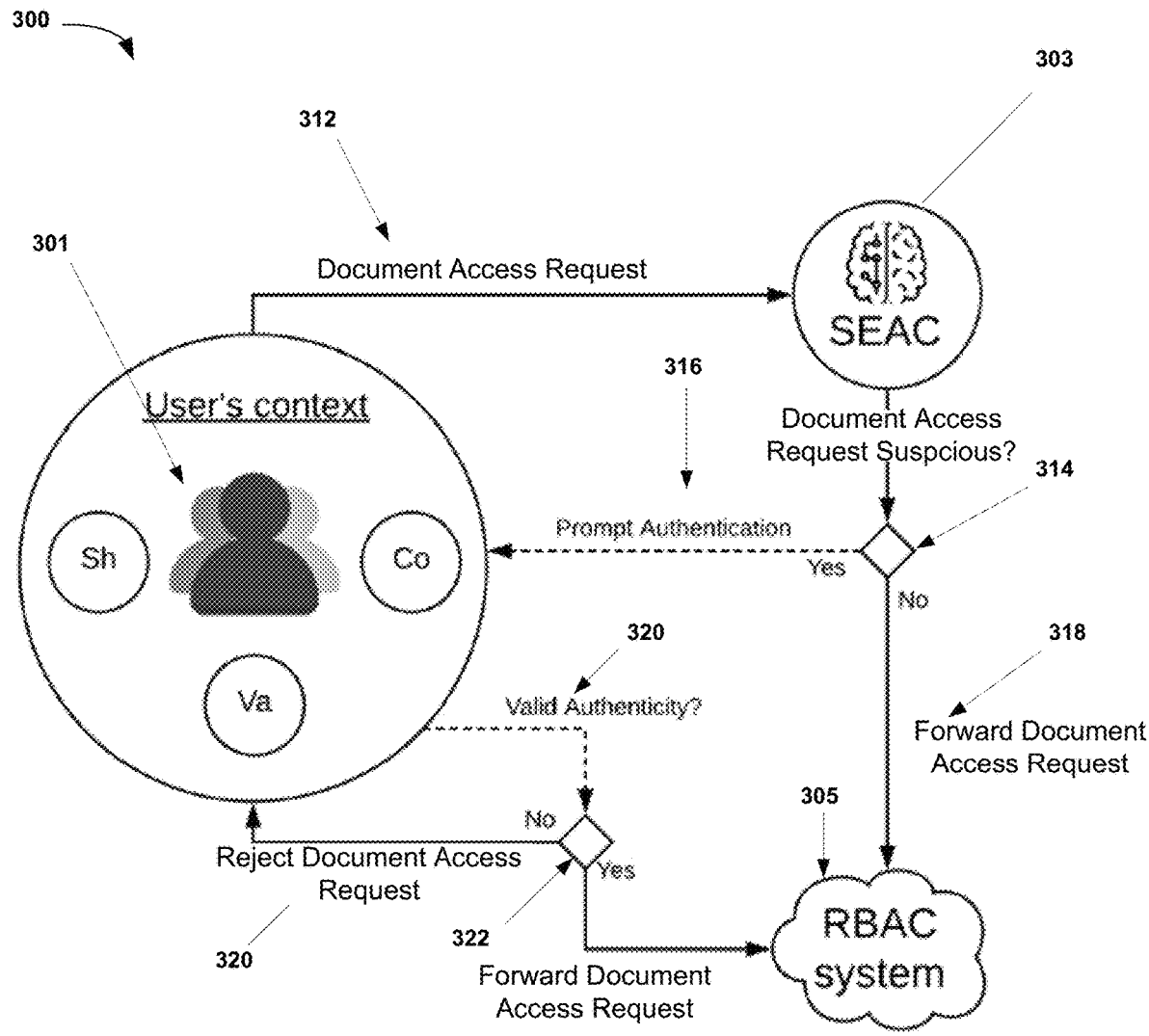
FIG. 3 is a schematic diagram of a context-based access control system in accordance with an example embodiment of the present disclosure.

Referring to FIG. 3, an example embodiment of a context-based access control system 300 of the present disclosure will be described. The context-based access control system 300 comprises context-information 301, a smart enterprise access control (SEAC) system 303 and an RBAC system 305. The RBAC 305 is connected to the document management server 110 and document database 114.

At 312, a user submits a document access request to perform an action in relation to a document stored in the document database 114. An action may be, for example, a request to delete the document, a request to change the contents of a document, a request to access the document, and so forth. In some example embodiments, available actions are categorized as read (R), write (W), delete (X), set (S) (an action to set a permission designation), and clear (C) (an action to clear a permission designation), collectively referred to as R/W/X/S/C actions.

The document access request comprises document properties and access properties identifying properties and access properties. The document properties may comprise any one or a combination of a document name, document number, document type, document location, author, edit date, or create date among other possibilities. The access properties may comprise a type of access (or action) and optionally other properties such as an access period among other possibilities.

At 314, the SEAC system 303 determines whether the document access request matches access criteria for granting the document access request using context-information which comprises derived user-context properties and/or derived document-context properties. In other words, the SEAC system 303 determines whether the document access request is suspicious. The determination may be based on a comparison of the document properties of the requested document and user properties of the user associated with the document access request to the derived document-context properties associated with the requested document and the derived user-context properties associated with the user associated with the document access request.

The determination of whether the document access request matches access criteria for granting the document access request (e.g., whether the document access request is suspicious) may be performed using machine learning techniques that analyze contexts which caused certain actions to either be accepted or rejected. In response to a determination that the document access request does not match access criteria for granting the document access request (e.g., the document access request is determined to be suspicious), an authentication request is generated and presented as a prompt on a communication device 201 of the respective user at 316. FIG. 8 shows an example prompt user interface screen (or window) 800 for requesting authentication. The authentication request is typically a re-authentication request performed during a session. The prompt may request a resubmission of (i) authentication information previously submitted at the start of or recommencement of a session (for example, after a security timeout or lockout) such as a username and password or PIN, (ii) additional or different authentication information or provide multifactor authentication such as a biometric information (e.g., fingerprint, iris scan, etc.), or (iii) a combination of previously submitted authentication information and additional or different authentication information. In response to a determination that the document access request matches access criteria for granting the document access request (e.g., the document access request is determined to be unsuspicious), the document access request is forwarded to the RBAC system 305 at 318.

At 320, input received from the communication device 201 of the respective user in response to the authentication prompt is evaluated. In response to a failed authentication of the user, the document access request is rejected at 320. This typically comprises logging the failed document access request and its context by the SEAC system 303, and generating and presenting a notification of the failed authentication and/or failed document access request on communication device 201 of the respective user at 316. The failed document access request may also be logged by the RBAC system 305. In response to an authentication of the user, the document access request is forwarded to the RBAC system 305 at 322.

Context-Information

The DMS 100 stores each document access request, the decision as to whether access was granted or denied, information describing the action that performed in response to a granted document access request (e.g., R/W/X/S/C), and document properties and user properties associated with the document access request and the result thereof. The DMS 100 stores the document properties and user properties as a series of values of the respective properties over time. The SEAC system 303 uses context-information requests to determine whether the document access request matches access criteria for granting the document access request (e.g., whether the document access request is suspicious). The context-information may comprise inherent or intrinsic context-information based on user properties and document properties, derived context-information derived from the inherent or intrinsic context-information, or a combination thereof. The derived context-information may comprise derived user-context properties, derived document-context properties or a combination thereof.

The user properties and document properties that make up the inherent or intrinsic context-information are stored in response the document access request and any corresponding document access as the document access requests and document access occur in real-time or substantially real-time. The derived context-information may be determined in real-time or substantially real-time as inherent or intrinsic context-information is generated or as needed, for example, in response to each document access request. The derived context-information is also stored and maintained by the DMS 100 along with the inherent or intrinsic context-information. The DMS 100 may maintain a first set of records relating to a plurality of documents stored by the DMS 100 and a second set of records relating to the plurality of users of the DMS 100. Each of the first set of records comprises a plurality of document properties. The document properties comprising document-identifying properties, document-access properties and derived document-context properties. Each of the second set of records comprising user properties, the user properties comprising user-identifying properties, user-access properties and derived user-context properties.

Classifications of the document access requests and optionally document access as matching or not matching access criteria for granting the document access request (e.g., whether the document access request is suspicious) is also stored by the DMS 100. Classifications and other analytics are also stored by the DMS 100, potential with respect to different time periods of analysis.

Document properties comprise data associated with specific documents. The document properties may comprise any one or more of data that represents a frequency at which the document is accessed (e.g., how often it is accessed), the type of access taken with respect to the document such the type one or more previous actions (e.g., R/W/X/S/C) which have been performed with respect to a specific document, a location at which a document access request or action occurred, a time at which the document access request or action occurred, a communication type used for the document access request or action (e.g., unsecured Wi-Fi, VPN, etc.), a user who performed the document access request or action, a value of the document, or other document property.

The location at which a document access request or action occurred may be a geolocation (e.g., Seattle) or a network location such as a Wi-Fi access point (e.g., Bob's Home Wi-Fi). The location may be represented by a user group such as a business unit associated with the geolocation or network location. For example, the location may indicate that a computing device in the "marketing" business unit accessed a document.

The time at which the document access request or action occurred may be identified by a date and/or time stamp or a categorization of the time (e.g., during business hours, outside of business hours, daytime, nighttime, etc.).

The user who performed the document access request or action may be identified by any combination of username or ID, proper name, title (role or function), user group (e.g., business unit) or other factors.

The value of the document may be defined by an access or security property of the document stored in the DMS 100, or other suitable property of the document stored in the DMS 100.

User properties may comprise any one or more of a measure of a frequency (e.g., how often) at which a user accesses documents in the DMS 100, a type of access a user utilizes in accessing documents in the DMS 100 (e.g., R/W/X/S/C), a location of a user when accessing documents in the DMS 100, a time at which a user accesses documents in the DMS 100, a communication type used to accesses documents in the DMS 100 (e.g., e.g., unsecured Wi-Fi, VPN, etc.), a value of documents accessed in the DMS 100, or other user property.

The document properties and user properties may be stored as raw data by the DMS 100. The document properties and user properties are date and time stamped for time-based analysis. The derived information may also be stored such as a categorization or evaluation of the data (e.g., consistent with past behavior, inconsistent with past behavior, behavior determined to be suspicious, behavior determined to be unsuspicious, etc. based on whether the behavior is outside of expected ranges). Metadata regarding the document properties and user properties may also be stored.

The derived document-context properties may comprise one or both of a document-valuation property (denoted Va) representing a measure of value of a particular document or a document shareability property (denoted Sh) representing a measure of how much a particular document is shared between users. The derived user-context property may comprise a user-cooperation property (denoted Co) indicating a measure of how a particular user cooperates with other users.

Definitions of variables used in deriving the derived context-information in accordance with example embodiments of the present disclosure are:

| Variable | Description |
| --- | --- |
| D | set of Documents |
| i, j | instances $\in$ D |
| U | set of Users |
| u, v | instance $\in$ U |
| $\tau_k$ | kth instance of timeframe $\tau$ |
| $\Delta_k$ | length of each timeframe $\tau_k$ |
| $\alpha$ | weight given to past calculations |
| A: {R, W, X, S, C} | set of Actions: Read, Write, Delete(X), Set and Clear permission |
| $\gamma_{u,i}$ | Action matrix of u on i |
| $\delta_{u,i}$ | Interaction weight between u and i |
| $\omega_{u,i}$ | Valued action weight of u performing i |
| $\Omega_{u,i}$ | Average valued action on i |
| $\lambda_{u,i}$ | Highest social action by u on i |
| $\Lambda_u$ | Action matrix of u |
| $\mu_{u,v}$ | Weighted cooperation of u with v |
| $Sh_i(\tau_k)$ | Shareability of document within $\tau_k$ |
| $Va_i(\tau_k)$ | Valuation of document within $\tau_k$ |
| $Co_u(\tau_k)$ | Cooperation of user within $\tau_k$ |

Document Shareability

Figure 4:
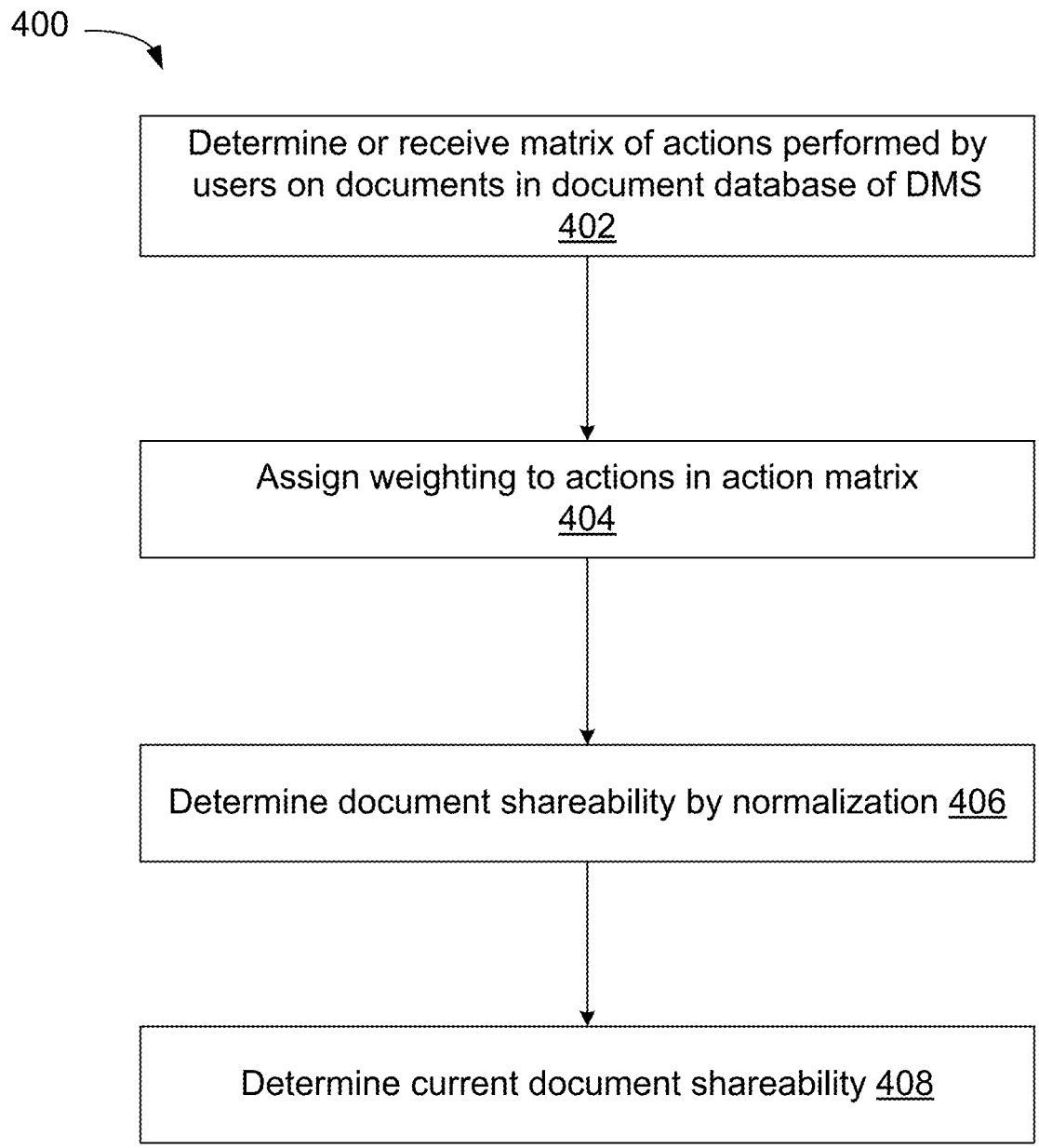
FIG. 4 is a flowchart of a method of determining a document shareability property in accordance with an example embodiment of the present disclosure.

Referring now to FIG. 4, a method 400 of determining a document shareability property in accordance with an example embodiment of the present disclosure will be described. At 402, an action matrix $\gamma_{u,i}$ is determined or received. The action matrix represents all actions (e.g., R/W/S/C/X) performed by users u on documents i with reference to a period of time, denoted by $\Delta_k$, in accordance with Eq. 1:

$$\gamma_{u,i}(\Delta_k) = [\Sigma R, \Sigma W, \Sigma S, \Sigma C, \Sigma X] \qquad (1)$$

The actions in the action matrix may be the set of all previous actions or a subset of previous actions. The subsets of previous actions may be defined based on user properties, for example a subset of users having the same business unit (BU). The subset of previous actions may be defined based on document properties, for example the subset of documents upon which an action was performed during an allocated portion of the day (e.g., business hours).

$$\delta_{u,i}(\Delta_k) = \begin{cases} 2, & \gamma_{u,i}(\Delta_k)|W| > 0 \\ 1, & \gamma_{u,i}(\Delta_k)|R| > 0 \\ 0, & \text{else} \end{cases} \qquad (2)$$

At 404, weights of specific interactions, denoted $\delta_{u,i}(\Delta_k)$, between users and documents. The actions (e.g., R/W/X/S/C) performed on a document are weighted to represent a weighted measure of the nature of the action performed on the document. Weights may be assigned to actions based on the amount of control the action allows. For example, a read-access action may be weighted proportionately less weight than a write-access action. The weights may be assigned to actions per period of time. In some examples, the weights of specific interactions are defined in accordance with Eq. 2:

In Eq. 2, a document is considered to be shared when it is either rewritten upon or read. The assigned weights in Eq. 2 value a writing (W) action at twice the value of a reading (R) action. However, any weighting allocation may be used provided at least some of the actions performed are assigned different weights to allow for differentiation.

At 406, a document shareability $Sh_i$ is determined for each document using the weighted action matrix $\delta_{u,i}(\Delta_k)$ by performing a normalization. The normalization process may be performed with reference to a subset of actions, a subset of documents, or a combination thereof. One example approach to normalizing the weighted action matrix includes utilizing the weight specific interactions of a document i by dividing the sum of all entries in the weighted action matrix $\delta_{u,i}(\Delta_k)$ for the period of time $\Delta_k$ with the sum of the weighted action matrices of all documents in the document database 114 of the DMS 100 as shown through example Eq. 3 below:

$$Sh_i(\Delta_k) = \frac{\sum_{u=0}^{U} \delta_{u,i}(\Delta_k)}{\sum_{j=0}^{D} \sum_{u=0}^{U} \delta_{u,j}(\Delta_k)} \qquad (3)$$

The normalization results in instant shareability ($Sh_i$), specific to a time period $\Delta_k$, which normatively quantifies how much a document i was shared by each user compared to the other documents in the document database 114 of the DMS 100. A normalized shareability value may allow for ease of comparison across the DMS 100.

At 408, a current document shareability is determined. In this process, the actions for a more current period of time have proportionately more weight than a later period of time. In some examples, the previous values of the document shareability are uniformly discounted. In other examples, previous values are simply discarded. In further examples, successively older values of document shareability (or document and user properties underlying previous shareability values) have a gradually decreasing impact on the determination of shareability in a present period of time.

In one example, the current document shareability in time period $\tau_k$ is determined in accordance with Eq. 4, wherein $\Delta_T$ represents a plurality of periods of time over which document $Sh_i$ values are evaluated, $\alpha_1$ is a time-degrading weight that defines the importance given to past $Sh_i$ values:

$$Sh_i(\tau_k) = \sum_{t=1}^{k} \alpha_1^t (1-\alpha_1) Sh_i(\Delta_t) \qquad (4)$$

Document Valuation

Figure 5:
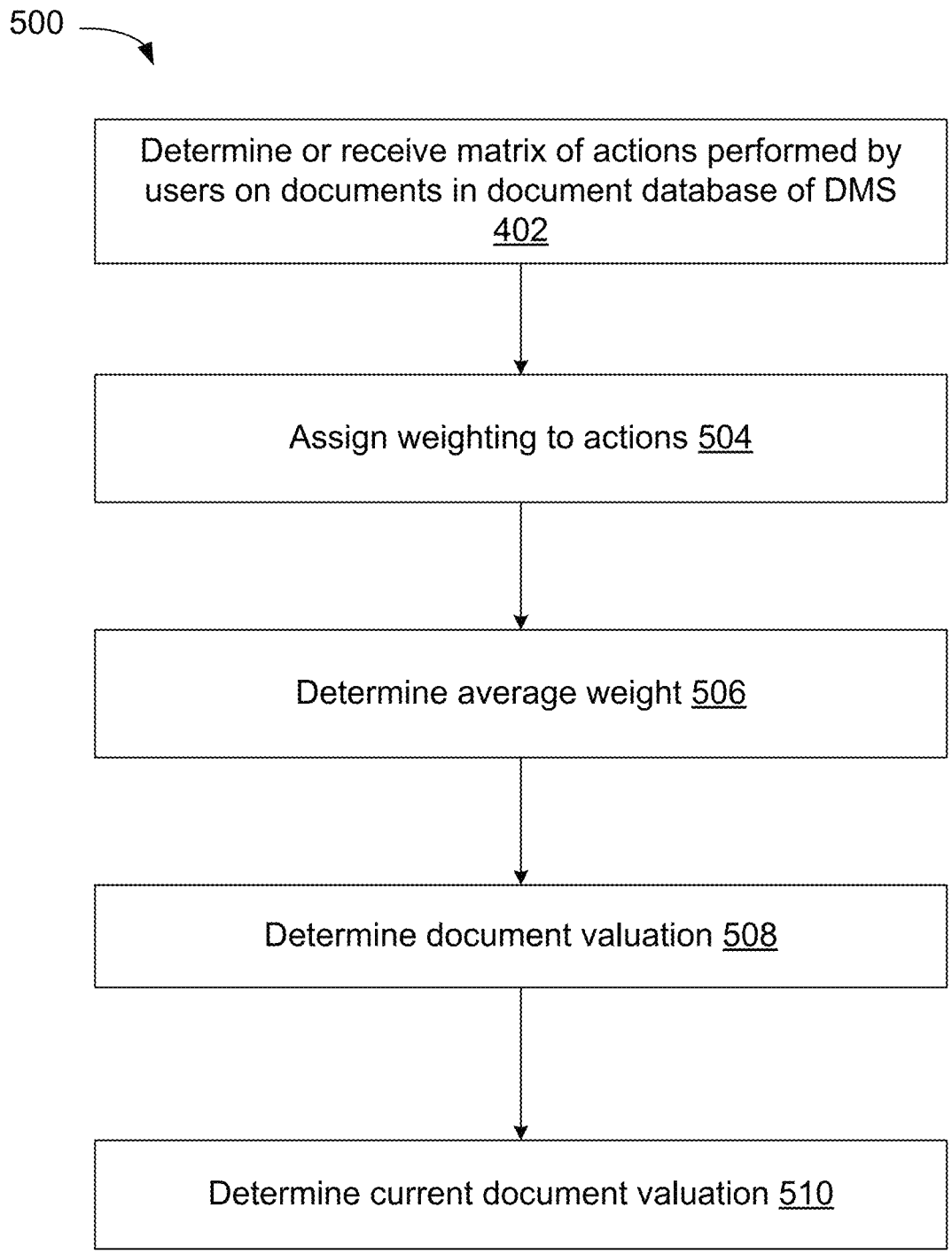
FIG. 5 is a flowchart of a method of determining a document valuation property in accordance with an example embodiment of the present disclosure.

Referring now to FIG. 5, a method 500 of determining a document valuation property in accordance with an example embodiment of the present disclosure will be described. Document valuation may be determined by reference to number of edits, reads and permission increase or decrease in a period of time or a plurality of periods of time. Document valuation may be assessed by determining an average value such as a per user basis associated with the actions taken in a document.

At 402, an action matrix is determined or received as described above.

At 504, the actions (e.g., R/W/X/S/C) performed on a document are weighted to represent a weighted measure of the nature of the action performed on the document. Weights may be assigned to actions based on the amount of control the action allows. For example, a read-access action may be weighted proportionately less weight than a write-access action.

Eq. 5 provides an example of a weighted action matrix $\omega$ for each document i and user u the weighting of each action (in regards to an assigned weight with reference to timeframes, denoted by $\Delta_k$):

$$\omega_{u,i}(\Delta_k) = \begin{cases} 4, & \gamma_{u,i}(\Delta_k)|W| > 0 \\ -1, & \gamma_{u,i}(\Delta_k)|R| > 0 \\ 1, & \gamma_{u,i}(\Delta_k)|C| > 0 \\ 0, & \text{else} \end{cases} \qquad (5)$$

In the example shown in Eq. 5, the weight given to writing (W) on a document is four times as beneficial as clearing a permission (C). Reading a document (R) without any other contributions within this timeframe degrades document valuation.

At 506, an average weight per user in the DMS 100 for the document i is determined. The average value weight, denoted $\Omega_i(\Delta_k)$, defined on each document i, may be determined using the valued weights brought on by each user u as shown in Eq. 6:

$$\Omega_i(\Delta_k) = \frac{\sum_{u=0}^{U} \omega_{u,i}(\Delta_k)}{|U'_u(\Delta_k)|} \qquad (6)$$

wherein the term $U'_u$ denotes the sum of users who have performed an action on the document i. $U'_u$ may be determined with reference to Eq. 7:

$$U'_u(\Delta_k) : u \in U_u(\Delta_k) | \omega_{u,i} \neq 0 \qquad (7)$$

At 508, a document valuation is determined by classifying the average value weights $\Omega_i(\Delta_k)$ in accordance with intervals. In one example, the document valuation is assigned one of 4 values in accordance with Eq. 8:

$$Va_i(\Delta_k) = \begin{cases} 1, & \Omega_i(\Delta_k) > 3 \\ 0.75, & \Omega_i(\Delta_k) > 2 \\ 0.5, & \Omega_i(\Delta_k) > 1 \\ 0.25, & \Omega_i(\Delta_k) > 0 \\ 0, & \text{else} \end{cases} \qquad (8)$$

Eq. 8 may be used to represent the document valuation in example embodiments, and is a combined weighted measure of how often the document is accessed and the nature of the action, as the averaged valued weight $\Omega_i(\Delta_k)$ incorporates the weighted action matrix $\omega$ above.

Over time, the document valuation in accordance with Eq. 8 may diverge to 0. In the example described above, if a document has been published and only read by a majority of users, the value of document degrades to nothing (based on the assigned weight of read only actions) from the point of view of the DMS 100. A large read only event in the past may skew any further change to the document valuation because the impact of the size of the initial distribution relative to later actions.

At 510, a current document valuation is determined. Similar to 408, a weighted measure of the recency of the action performed on the document is determined, wherein the document valuation Va discussed above in Eq. 8 for a more current period of time has proportionately more weight than a later period of time. In example embodiments, previous values of document valuation Va are simply discarded. Alternatively, successively older values of document valuation (or document and user properties underlying previous document valuation values) have a gradually decreasing impact on the determination of document valuation in a present period of time.

In one example, the current document valuation in time period $\tau_k$ may be determined in accordance with Eq. 9 utilizing a recency of action technique, wherein $\Delta_T$ represents a plurality of periods of time over which document $Va_i$ values are evaluated, $\alpha_2$ is a time-degrading weight that defines the importance given to past $Va_i$ values:

$$Va_i(\tau_k) = \sum_{t=1}^{k} \alpha_2^t (1-\alpha_2) Va_i(\Delta_t) \qquad (9)$$

User Cooperation

Figure 6:
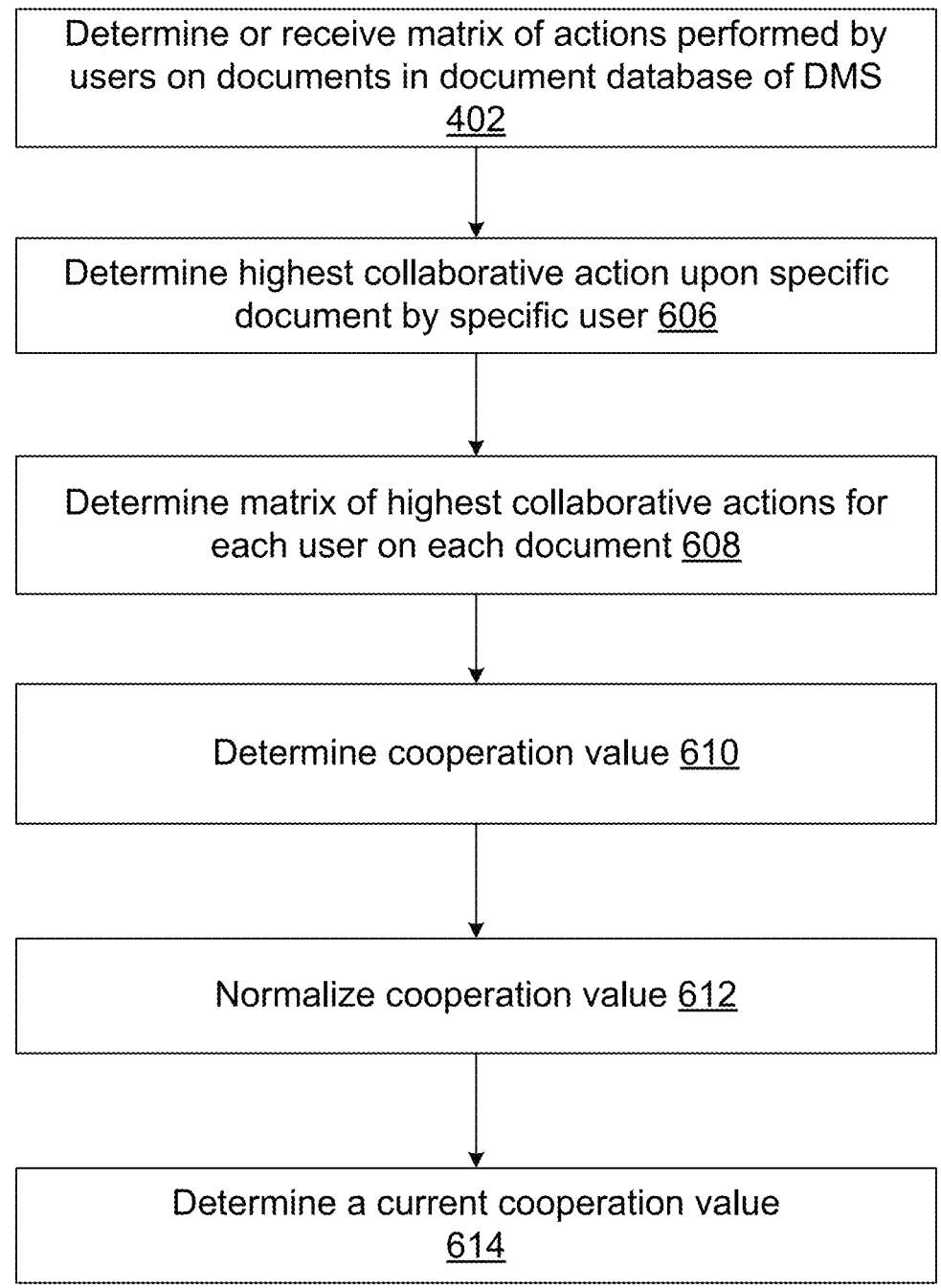
FIG. 6 is a flowchart of a method of determining a user cooperation property in accordance with an example embodiment of the present disclosure.

Referring now to FIG. 6, a method 600 of determining a user cooperation (Co) property in accordance with an example embodiment of the present disclosure will be described. User cooperation may represent a level of user interaction within the DMS 100 and may be interpreted using actions performed on documents by different users.

At 402, an action matrix is determined or received as described above.

At 606, a highest collaborative action $\lambda_{u,i}(\Delta_k)$ is determined. The highest collaborative action $\lambda_{u,i}(\Delta_k)$ is similar to the action matrix $\gamma_{u,i}$ except that $\lambda_{u,i}(\Delta_k)$ contains only a single value representing the highest evaluated action on a specific document i by that user u. A weight or priority given to actions when determining the highest collaborative action may be the same as the weights in Eq. 12 below. Alternatively, the weights may be assigned in accordance as described above or may be assigned such that the relative weights between the actions are non-negligible.

In at least some examples, the highest collaborative action is determined in accordance with Eq. 10:

$$\lambda_{u,i}(\Delta_k)[x] = \begin{cases} 1, & \gamma_{u,i}(\Delta_k)[x] > 0 \wedge (\neg \exists\, y.\gamma_{u,i}(\Delta_k)[y] > 0 \wedge y < x) \\ 0, & \text{else} \end{cases} \quad (10)$$

wherein x represents each index of the row or each possible action defined in A.

At 608, the highest collaborative actions of each user are combined in a matrix that represent all actions performed by each user u on each document i. In at least some examples, the actions may be combined in accordance with Eq. 11:

$$\Lambda_u(\Delta_k) = [\lambda_{u,i}(\Delta_k)], \forall i \in D \quad (11)$$

A single row in $\Lambda_u(\Delta_k)$ represents the highest collaborative action on a specific document i by a specific user u and columns represent a set D. An empty row signifies no actions were performed on document i by user u within time period $\Delta_k$.

At 610, a cooperation value is determined. The cooperation value represents an amount of cooperation between different users is determined based on the amount of documents in which each user has performed an action and the extent of involvement in the documents by the users.

In some examples, instances of overlap between users with respect to one document are determined and each user that collaborated on the document is assigned the same score. In other examples, a weighted measure of the nature of the action performed on the document is determined. The assigned weights are based on the nature of the action and delineate the level of cooperation between users on a document. In one example in which two users collaborated on the same document, a weighted cooperative value $\mu_{u,v}(\Delta_k)$ may be determined in accordance with Eq. 12:

$$\mu_{u,v}(\Delta_k) = \begin{cases} 5, & \exists\, i(\Lambda_u(\Delta_k)[i, |W|] = 1 \wedge \exists\, a(\Lambda_v(\Delta_k)[i, a] = 1)) \\ 4, & \exists\, i(\Lambda_u(\Delta_k)[i, |S|] = 1 \wedge \exists\, a(\Lambda_v(\Delta_k)[i, a] = 1)) \\ 3, & \exists\, i(\Lambda_u(\Delta_k)[i, |C|] = 1 \wedge \exists\, a(\Lambda_v(\Delta_k)[i, a] = 1)) \\ 2, & \exists\, i(\Lambda_u(\Delta_k)[i, |X|] = 1 \wedge \exists\, a(\Lambda_v(\Delta_k)[i, a] = 1)) \\ 1, & \exists\, i(\Lambda_u(\Delta_k)[i, |R|] = 1 \wedge \exists\, a(\Lambda_v(\Delta_k)[i, a] = 1)) \\ 0, & \text{else} \end{cases} \quad (12)$$

Eq. 12 determines instances wherein the highest collaborative actions with respect to a document i by the user u coincides with an action performed on the document i by the user v. Eq. 12 assigns an interval score based on the final value across actions. Eq. 12, similar to interval score in Eq. 10, is intended to delineate the values of $\Lambda_u(\Delta_k)$ into categories.

The cooperative value may not be symmetric between users such that the value of $\mu_{u,v}(\Delta_k)$ is not the same as the value of $\mu_{v,u}(\Delta_k)$. Eq. 12 may match high instance interactions of one user with any interactions of a second user. In some examples, the weighted cooperative value may be determined using only interactions between users having interactions above a certain value for both users. In example embodiments, the weighted cooperative value may be determined using any and all interactions between two users.

At 612, the cooperative value is normalized with respect to the number of total interactions between users. In some examples, the normalization may occur with respect to a subset of users. In one example, the weighted cooperative value may be determined is normalized to allow for comparison in accordance with Eq. 13:

$$Co_u(\Delta_k) = \frac{\sum_{u=0}^{U} \mu_{u,v}(\Delta_k)}{\sum_{u=0}^{U} \sum_{v \neq u}^{U} \mu_{u,v}(\Delta_k)} \quad (13)$$

At 614, a current cooperative value is determined. Similar to the document-derived properties described above, a weighted measure of the recency of the actions performed on the documents may be determined in which the weighted cooperative value $Co_u$ in Eq. 13 for a more current period of time has proportionately more weight than a later period of time. In one example, the current cooperative value may be determined in accordance with Eq. 14:

$$Co_u(\Delta_k) = \sum_{t=1}^{k} \alpha_3^t (1 - \alpha_3) Co_u(\Delta_t) \quad (14)$$

wherein $\alpha_3$ is a time-degrading weight that defines the importance given to past cooperative values $Co_t$.

Context-Based Access Control Method

Figure 7:
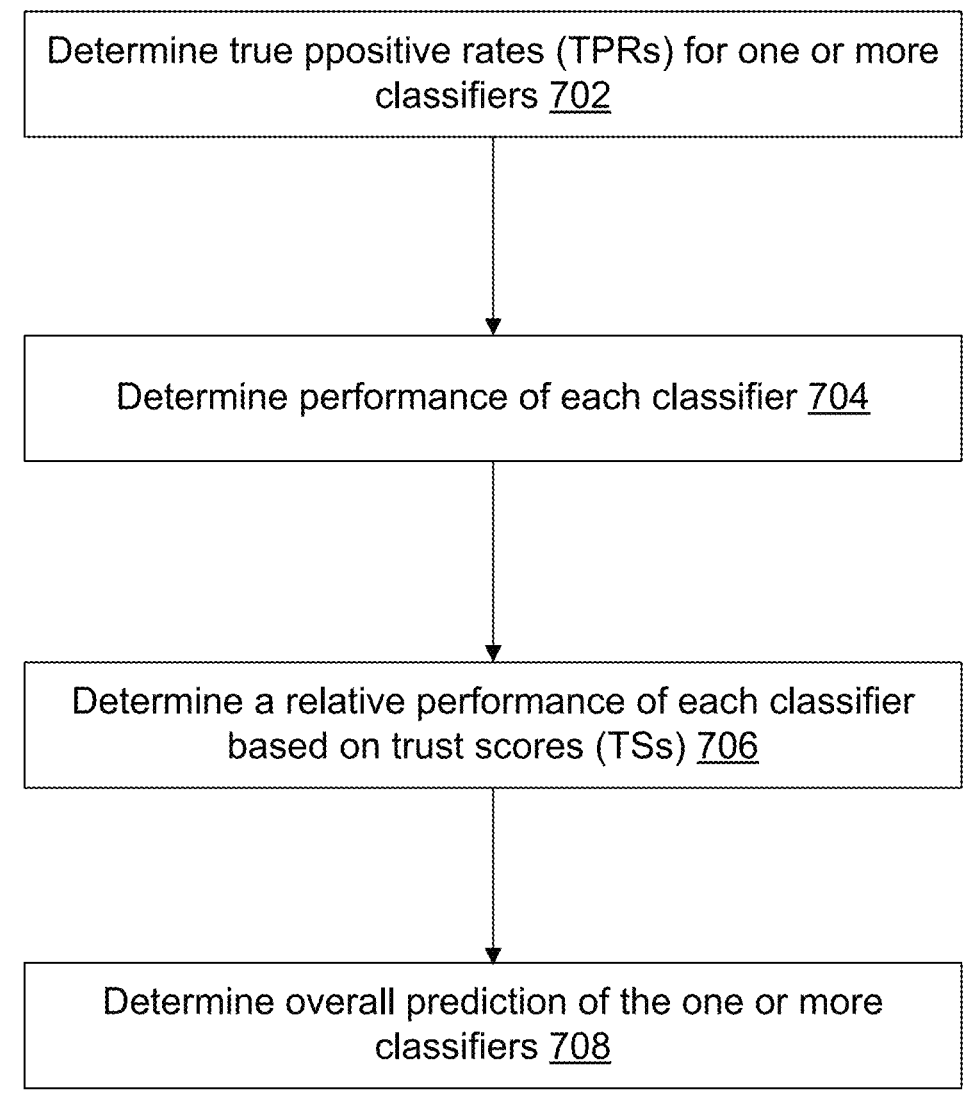
FIG. 7 is a flowchart of a context-based access control method in accordance in accordance with an example embodiment of the present disclosure.

Referring now to FIG. 7, a context-based access control method 700 in accordance in accordance with an example embodiment of the present disclosure will be described. The method 700 provides a method of smart enterprise access control that may performed via the context-based access control system 300 of FIG. 3. The method 700 may use an ensemble learning approach based on adaptive supervised learning. The adaptive supervised learning may use an adaptive weighted voting technique which attributes varying weights to multiple classifiers and optionally the underlying factors in determining the derived document-context properties and user-context properties.

A classifier is a scheme which attempts to predict a class pertaining to a particular point of data. For example, the classifier may determine a document access request, based on the provided and derived user and document properties, should be classified in the "suspicious" class. Examples of classification schemes include Random Forest (RF), Naive Bayes (NB), and Support Vector Machines (SVM). The classifiers may be configured to provide confidence scores instead of simple binary predictions as inputs.

In some example embodiments, multiple classification schemes (i) may be used in an attempt to optimize the determination of whether a document access request matches access criteria for granting the document access request (e.g., whether the document access request is suspicious) and requires authentication. For example, an average of the classification of 3 different classification schemes may be used to make a single determination. In other example embodiments, a single classification scheme is used to determine whether a document access request matches access criteria for granting the document access request (e.g., whether the document access request is suspicious) and requires authentication.

Definitions of variables used in classification in accordance with example embodiments of the present disclosure are:

| Notation | Description |
| --- | --- |
| N | Set of i classifiers |
| T | Set of t time-frames |
| TP | True Positive |
| FN | False Negative |
| $TPR_{i,t}$ | True Positive rate of i during t |
| $\alpha_4$ | Weight of previous TPR |
| $Pf_{i,t}$ | Performance Factor of i during t |
| $TS_{i,t}$ | Trust Score of i during t |
| $P_{Auth}(i)$ | Predicted Rejection Confidences of i |
| $P_{Allow}(i)$ | Predicted Acceptance Confidences of i |

A combination of predictions by classifiers and assigned trust scores (TS), described below, may improve the tradeoff in standard machine learning models between security rates (precision) and efficiency rates (recall) in access control decisions. Different classification schemes may be combined via a weighting. The weighting of classification schemes may comprise determining a metric representing True Positive Rates (TPRs) also known as security rates. The TPR represents the security rating of each individual classification scheme. The TPR metric may be used to determine the weight given to each classification scheme, which the influence of a classification scheme on the final prediction. The weights are assigned based on the highest TPR within each timeframe as seen in Eq. 15 below.

At 702, TPRs are determined based on historical data. In some examples, TPR values for each classification scheme i over time period t may be determined in accordance with Eq. 15:

$$TPR_{i,t} = \frac{TP_{i,t}}{TP_{i,t} + FN_{i,t}} \quad (15)$$

wherein the true positives (TP) are occurrences of suspicious actions being correctly predicted as rejected and authentication being required. False negatives (FN) are occurrences of suspicious actions being incorrectly predicted as accepted, thus receiving no authentication.

At 704, a performance factor of classification scheme i over time period t is calculated. In some examples, the performance factor may be determined in accordance with Eq. 16:

$$Pf_{i,t} = \alpha_4 TPR_{i,t-1} + (1-\alpha_4) TPR_{i,t} \quad (16)$$

wherein $\alpha_4$ is the threshold of change over time.

At 706, the relative performance of the classifiers is determined. For example, the performance factor $Pf_{i,t}$ may be normalized with respect to a single classifier acting on a set of data, multiple classifiers acting on subsets of data, or any combination thereof. In example embodiments, the normalization may be determined in relation to the average performance factor of classifiers and known as a "trust score" (TS). The TS represents the trust given to each classification scheme, relating to the weight given to the respective predictions. In some examples, the trust score may be determined in accordance with Eq. 17:

$$TS_{i,t} = \frac{Pf_{i,t}}{\sum_{j=0}^{N} Pf_{j,t}} \quad (17)$$

In certain instances, the TS of underperforming classification schemes may converge to 0 if constantly outperformed by other classification scheme. This only improves results, as it represents members providing no valuable predictions.

At 708, a determination is made whether a document access request matches access criteria for granting the document access request (e.g., whether the document access request is suspicious) based on prediction(s) of the classification scheme(s). When multiple classification scheme(s) are used, each trust score is combined with the corresponding prediction. The cumulative weighted predictions of all classification schemes as either $P_{Auth}$ (i.e., the document access request does not match access criteria for granting the document access request) or $P_{Allow}$ (i.e., the document access request matches access criteria for granting the document access request). The output is a final prediction with the highest confidence, the document access request matches access criteria for granting the document access request and allow document access without authentication or the document access request does not match access criteria for granting the document access request and perform authentication of the user. In some examples, the determination may be performed in accordance with Eqs. 18-20:

$$P_{Auth} = \sum_{i=0}^{N} (TS_{i,t} \cdot P_{Auth}(i)) \quad (18)$$

$$P_{Allow} = \sum_{i=0}^{N} (TS_{i,t} \cdot P_{Allow}(i)) \quad (19)$$

$$\text{Prediction} = \begin{cases} \text{Authenticate}, & P_{Auth} > P_{Allow} \\ \text{Allow}, & \text{else} \end{cases} \quad (20)$$

In example embodiments, weights used to combine the outputs of the different classification schemes are assigned based on highest TPR within each timeframe. The final prediction is based on a cumulative value of the classification schemes in which each of the classifiers is assigned a weight, with more accurate classifiers having a proportionately higher weight.

The time periods used in the analysis presented above may be a single day, a single week, bi-weekly, monthly, or other suitable duration. In some examples, The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A non-transitory machine readable medium having tangibly stored thereon executable instructions for execution by a processor of a computing device, wherein the executable instructions, when executed by the processor, cause the computing device to:
   maintain a first set of records relating to a plurality of documents stored by a document management system, each of the first set of records comprising a plurality of document properties, the document properties comprising document-identifying properties, document-access properties and derived document-context properties, wherein the derived document-context properties are weighted measures of the recency of access;
   maintain a second set of records relating to the plurality of users of the document management system, each of the second set of records comprising user properties, the user properties comprising user-identifying properties, user-access properties and derived user-context properties, wherein the derived user-context properties are weighted measures of the recency of access;
   receive a document access request for a document in the plurality of documents stored by the document management, wherein the document access request is associated with a user in the plurality of users of the document management system, wherein the document access request comprises document properties comprising document-identifying properties identifying the document and document-access properties specifying a type of access;
   determine whether the document access request matches access criteria for granting the document access request based on a comparison of the document properties of the requested document and user properties of the user associated with the document access request to the derived document-context properties associated with the requested document and the derived user-context properties associated with the user associated with the document access request; and
   in response to determining that the document access request does not match the access criteria, send an authentication request to the user.

2. The non-transitory machine readable medium of claim 1, wherein the executable instructions, when executed by the processor, cause the computing device to:
   in response to successful authentication of the user, permit access to the requested document.

3. The non-transitory machine readable medium of claim 1, wherein the executable instructions, when executed by the processor, cause the computing device to:

in response to determining that the document access request does match the access criteria, permit access to the requested document.

4. The non-transitory machine readable medium of claim 1, wherein the derived document-context properties and derived user-context properties are derived from document access over a period of time.

5. The non-transitory machine readable medium of claim 1, wherein the instances of document access during a more current period of time are assigned proportionately more weight than instances of document access during an older period of time.

6. The non-transitory machine readable medium of claim 1, wherein the weight given to document access during an older period of time decreases non-linearly over time.

7. The non-transitory machine readable medium of claim 1, wherein the derived document-context properties are weighted aggregate-measures of one or more of a frequency at which the document is accessed, a type of access taken with respect to the document, a location of the document access, a time at which the document is accessed, an identity of the user accessing the document, a communication type used to access the document, or a value of the document.

8. The non-transitory machine readable medium of claim 1, wherein the derived document-context properties is a weighted measure of the type of access taken with respect to the document with each type of access being assigned a weight, wherein the at least some of the assigned weights are different, wherein the type of access taken with respect to the document is one of read (R), write (W), delete (X), set a permission designation (S), or clear a permission designation (C) action.

9. The non-transitory machine readable medium of claim 8, wherein the derived document-context properties is a weighted measure of the type of access taken with respect to the document with a read action being proportionately less weight than a write action.

10. The non-transitory machine readable medium of claim 1, wherein the derived user-context properties comprises one or more of a measure of user-activity in relation to a user's activity history, a measure of user-activity in relation to an average user in the same user group or business unit, or a measure of user-activity in relation to an average user of the document management system.

11. The non-transitory machine readable medium of claim 1, wherein the derived user-context properties are weighted aggregate-measures of one or more of a frequency at which a user access documents, a type of access a user utilizes in accessing documents, a location of a user when accessing documents, a time at which a user accesses documents, a communication type used to accesses documents, or a value of the documents accessed by a user.

12. The non-transitory machine readable medium of claim 1, wherein the executable instructions, when executed by the processor, cause the computing device to:
add the document-access properties of the document access request to the first set of records for the requested document;
add the user-access properties of the document access request to the second set of records for the requesting user;
update the derived document-context properties using the document-access properties; and
update the derived user-context properties using the added user-access properties of the document access request.

13. The non-transitory machine readable medium of claim 1, wherein the derived document-context properties comprises a document-valuation property representing a measure of value of a particular document and a document shareability property representing a measure of how much a particular document is shared between users, and wherein derived user-context properties comprises a user-cooperation property indicating a measure of how a particular user cooperates with other users.

14. The non-transitory machine readable medium of claim 1, wherein determining whether the document access request matches access criteria for granting the document access request comprises:
apply a plurality of classifiers for determining whether the document access request matches access criteria for granting the document access request;
determine true positive rates of the plurality of classifiers;
assign weights to the plurality of classifiers based on the true positive rates;
determine whether the document access request matches access criteria for granting the document access request based on the outputs of the plurality of classifiers and the weights assigned to the plurality of classifiers.

15. The non-transitory machine readable medium of claim 14, wherein determining whether the document access request matches access criteria for granting the document access request further comprises:
determine a performance of each of the plurality of classifiers;
determine a relative performance of each of the plurality of classifiers, wherein the weights assigned to the plurality of classifiers are based on the relative performance.

16. The non-transitory machine readable medium of claim 15, wherein the relative performance is based on trust scores.

17. The non-transitory machine readable medium of claim 14, wherein the true positive rates of the plurality of classifiers is based on a weighted measure of the recency of performance with true positive rates for a more current period of time being proportionately more weight than a later period of time.

18. The non-transitory machine readable medium of claim 14, wherein the weights assigned to the plurality of classifiers during an older period of time decreases non-linearly over time.

19. The non-transitory machine readable medium of claim 14, wherein determining whether the document access request matches access criteria for granting the document access request further comprises:
assign weights to the derived document-context properties and the derived user-context properties based on the true positive rates;
wherein the determination whether the document access request matches access criteria for granting the document access request is based on the weights assigned to the plurality of classifiers and the weights assigned to the derived document-context properties and the derived user-context properties.

20. The non-transitory machine readable medium of claim 17, wherein the plurality of classifiers are selected from the group consisting of Random Forest (RF), Naive Bayes (NB) and Support Vector Machines (SVM).

21. A computing device having a processor and a memory coupled to the processor, the memory having tangibly stored thereon executable instructions for execution by the processor, wherein the executable instructions, when executed by the processor, cause the computing device to:

maintain a first set of records relating to a plurality of documents stored by a document management system, each of the first set of records comprising a plurality of document properties, the document properties comprising document-identifying properties, document-access properties and derived document-context properties, wherein the derived document-context properties are weighted measures of the recency of access;

maintain a second set of records relating to the plurality of users of the document management system, each of the second set of records comprising user properties, the user properties comprising user-identifying properties, user-access properties and derived user-context properties, wherein the derived user-context properties are weighted measures of the recency of access;

receive a document access request for a document in the plurality of documents stored by the document management, wherein the document access request is associated with a user in the plurality of users of the document management system, wherein the document access request comprises document properties comprising document-identifying properties identifying the document and document-access properties specifying a type of access;

determine whether the document access request matches access criteria for granting the document access request based on a comparison of the document properties of the requested document and user properties of the user associated with the document access request to the derived document-context properties associated with the requested document and the derived user-context properties associated with the user associated with the document access request; and in response to determining that the document access request does not match the access criteria, send an authentication request to the user.

22. A method of performing access control in a document management system, comprising:

maintaining a first set of records relating to a plurality of documents stored by the document management system, each of the first set of records comprising a plurality of document properties, the document properties comprising document-identifying properties, document-access properties and derived document-context properties, wherein the derived document-context properties are weighted measures of the recency of access;

maintaining a second set of records relating to the plurality of users of the document management system, each of the second set of records comprising user properties, the user properties comprising user-identifying properties, user-access properties and derived user-context properties, wherein the derived user-context properties are weighted measures of the recency of access;

receiving a document access request for a document in the plurality of documents stored by the document management, wherein the document access request is associated with a user in the plurality of users of the document management system, wherein the document access request comprises document properties comprising document-identifying properties identifying the document and document-access properties specifying a type of access;

determining whether the document access request matches access criteria for granting the document access request based on a comparison of the document properties of the requested document and user properties of the user associated with the document access request to the derived document-context properties associated with the requested document and the derived user-context properties associated with the user associated with the document access request; and in response to determining that the document access request does not match the access criteria, sending an authentication request to the user.

* * * * *